United States Patent
Chang et al.

(10) Patent No.: US 8,310,615 B2
(45) Date of Patent: Nov. 13, 2012

(54) BACKLIGHT MODULE FOR PREVENTING FILMS FROM WAVING OR CURVING

(75) Inventors: Chi-Hung Chang, Hsin-Chu (TW); Te-Hai Tseng, Hsin-Chu (TW); Cheng-Wei Li, Hsin-Chu (TW); Ching-Sang Yang, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 233 days.

(21) Appl. No.: 12/955,968

(22) Filed: Nov. 30, 2010

(65) Prior Publication Data
US 2011/0157869 A1 Jun. 30, 2011

(30) Foreign Application Priority Data
Dec. 30, 2009 (TW) .............................. 98145983 A

(51) Int. Cl.
*G02F 1/1335* (2006.01)
*F21V 5/02* (2006.01)

(52) U.S. Cl. .............. 349/57; 349/56; 349/96; 362/97.1

(58) Field of Classification Search ................. 349/56, 349/62, 57, 95, 96, 113; 362/97.1, 97.2, 362/97.3, 97.4
See application file for complete search history.

(56) References Cited

U.S. PATENT DOCUMENTS

| | | | | |
|---|---|---|---|---|
| 7,559,683 B2 * | 7/2009 | Lee | ............................... | 362/620 |
| 7,753,565 B2 * | 7/2010 | Hsu et al. | ...................... | 362/339 |
| 7,855,763 B2 * | 12/2010 | Yuuki et al. | ...................... | 349/62 |
| 2009/0080218 A1 * | 3/2009 | Hsu et al. | ...................... | 362/620 |
| 2010/0046903 A1 * | 2/2010 | Mai et al. | ...................... | 385/132 |
| 2011/0157869 A1 * | 6/2011 | Chang et al. | ................. | 362/97.1 |

FOREIGN PATENT DOCUMENTS

| | | |
|---|---|---|
| TW | M274547 | 9/2005 |
| TW | M278904 | 10/2005 |
| TW | 200732779 | 9/2007 |
| TW | 200736718 | 10/2007 |
| TW | I327206 | 7/2010 |

OTHER PUBLICATIONS

English translation of abstract of TW 200736718.
English translation of abstract of TW I327206.
English translation of abstract of TW 200732779.
English translation of abstract of TW M278904.
English translation of abstract of TW M274547.

\* cited by examiner

*Primary Examiner* — Brian Healy
(74) *Attorney, Agent, or Firm* — McClure, Qualey & Rodack, LLP

(57) ABSTRACT

A backlight module which includes a frame and a first prism film is provided. The frame includes sidewall which encloses an inner space. The first prism film is disposed within the inner space and has a plurality of prisms on it. The prisms are in parallel and adjacent to each other, and the prisms extend along a first extending direction. The first prism film has a surrounding edge, which includes a first edge and a second edge. The prisms include a center prism being substantially located in a center position of all prisms. The center prism insects the surrounding edge at two intersection points; a first distance $D_1$ is between the intersection point and the sidewall. The surrounding edge further has an end point being located farthest from the center prism. A second distance $D_2$ is between the end point and the sidewall. The first distance $D_1$ is larger than the second distance $D_2$.

18 Claims, 9 Drawing Sheets

BACKLIGHT MODULE FOR PREVENTING FILMS FROM WAVING OR CURVING

BACKGROUND OF THE INVENTION

1. Field of the Invention

The present invention relates to a backlight module, and more particularly, to a backlight module capable of reducing the warpage of its optical film.

2. Description of the Prior Art

The display panel and the panel display apparatus using the display panel have become the mainstream among all kinds of display apparatuses. For example, a lot of display panels are used in panel display screens, home flat TVs, monitors of the personal computer, notebook, cell phone, and digital camera. Especially, in recent years, the market demand for LCD apparatus has highly increased. In order to meet the function and appearance requirements of the LCD apparatus, the design of the backlight module used in the LCD apparatus also becomes more diversified.

FIG. 1A and FIG. 1B illustrate a schematic diagram of a conventional backlight module. The conventional backlight module includes a frame 10 and a brightness enhancement film 30. The brightness enhancement film 30 is disposed in the frame 10 and used for changing the optical properties of the lights generated by the below light source to generate the backlight to meet the needs of display panel. A plurality of prisms 31 is formed on the brightness enhancement film 30 extending along a prism direction 33. When the backlight module or the display apparatus including the backlight module is heated, for example, the backlight module or the display apparatus is under an environmental test or used in a poor cooling space, the brightness enhancement film 30 will be heated and expanded to increase its area. Since the plurality of prisms 31 are formed on the brightness enhancement film 30, the extending length of the brightness enhancement film 30 along the prism direction 33 is longer than the extending length of the brightness enhancement film 30 vertical to the prism direction 33.

As shown in FIG. 1B, when the brightness enhancement film 30 extends and expands along the prism direction 33, the brightness enhancement film 30 will interfere with or touch against a sidewall 11 of the frame 10. Since the inner space of the frame 10 is limited, when the brightness enhancement film 30 touches against the sidewall 11, the brightness enhancement film 30 will be warped or wavy, so that the light processing of the brightness enhancement film 30 will be affected, and the quality of the output lights will be lowered.

SUMMARY OF THE INVENTION

A scope of the invention is to provide a backlight module to avoid the condition that an optical film of the backlight module is heated and warped.

A scope of the invention is to provide a backlight module to improve the quality of the backlight provided by the backlight module.

A scope of the invention is to provide a backlight module suitable for the higher-temperature working environment.

The backlight module mainly includes a frame and a first prism film. The frame is mainly enclosed by a sidewall and an inner space is enclosed by the sidewall. The first prism film is disposed within the inner space, and a plurality of prisms is formed on the first prism film. The plurality of prisms is arranged in parallel and extends along a first extending direction. The first prism film has a surrounding edge including a first edge and a second edge, and the first edge and the second edge are connected and vertical to each other. A center prism of the plurality of prisms is substantially located at a center position of the plurality of prisms. The center prism insects the surrounding edge at two intersection points. A first distance $D_1$ is between the sidewall and an intersection point that the center prism intersects the surrounding edge; a second distance $D_2$ is between the sidewall and an end point located on the surrounding edge and farthest from the center prism. The first distance $D_1$ is larger than the second distance $D_2$.

After the first prism film is heated or under a temperature-related environmental test, the first prism film will generate larger deformation along the first extending direction due to thermal expansion. In other words, the amount of deformation of the surrounding edge at the intersection point will be larger than the amount of deformation at the end point. Since the first distance $D_1$ is larger than the second distance $D_2$, the condition that the first prism film is deformed to interfere with the frame to be warped or wavy can be avoided, and the positioning reliability vertical to the first extending direction can be also maintained.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

The invention provides a backlight module. In a preferred embodiment, the backlight module is applied in a LCD apparatus. However, in different embodiments, the backlight module can be also applied in a computer keyboard, a cell phone key, a bulletin board, and other apparatuses needing planar light source. In the preferred embodiment, the above-mentioned LCD apparatus includes a color LCD apparatus. However, in different embodiments, the above-mentioned LCD apparatus can also include a single-color LCD apparatus. In addition, the LCD apparatus generally indicates any display apparatus using LCD panel, such as home LCD TVs, monitors of the personal computer, notebook, cell phone, and digital camera.

Figure 1A:
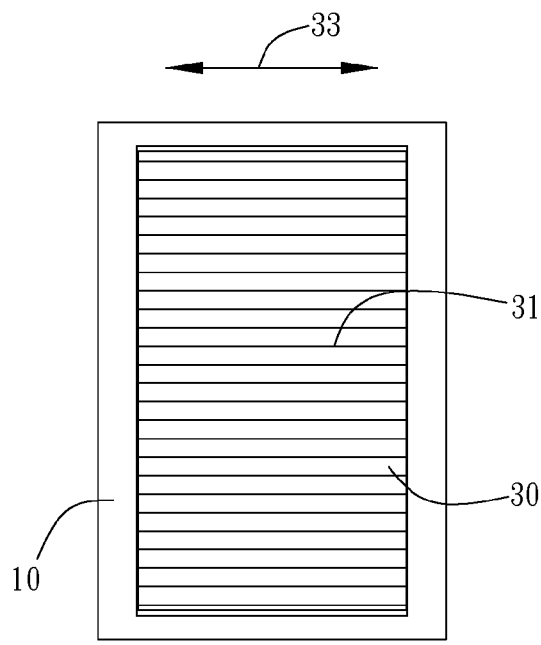
FIG. 1A and FIG. 1B illustrate schematic diagrams of a conventional backlight module.
Figure 1B:
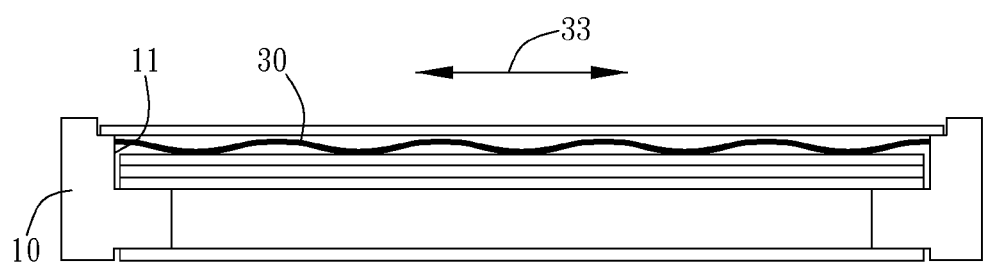
Figure 2:
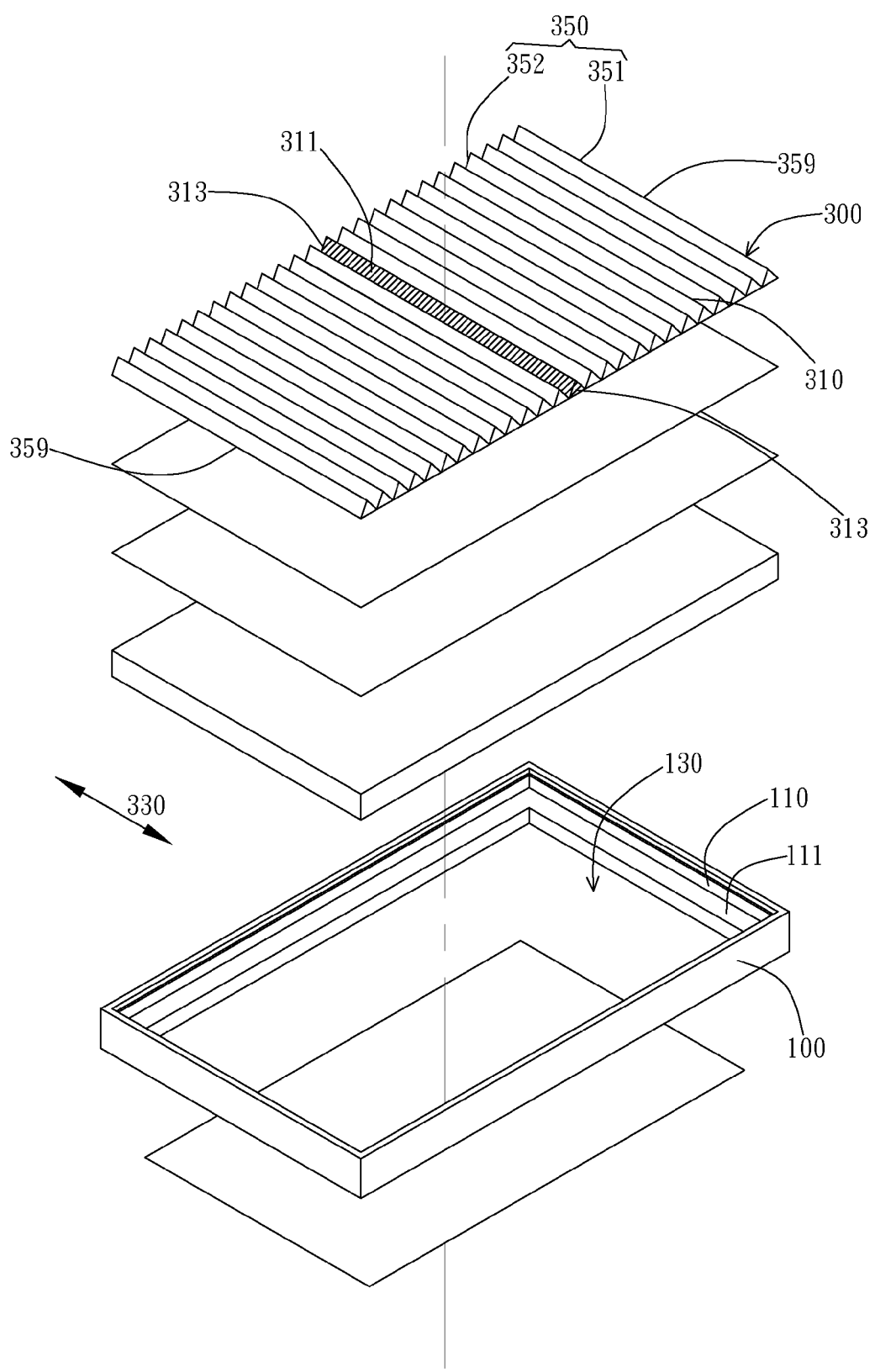
FIG. 2 illustrates an exploded diagram of an embodiment of the backlight module.

FIG. 2 illustrates an exploded diagram of an embodiment of the backlight module. As shown in FIG. 2, the backlight module includes a frame 100 and a first prism film 300. It is preferred that the frame 100 is formed by plastic material.

However, in different embodiments, the frame 100 can be also formed by metal or other materials. The frame 100 can be enclosed by the sidewall 110 based on the structure of a rectangle ring, and an inner space 130 is enclosed by the sidewall 110. The inner space 130 can be used to dispose light source, light guiding plate, or various kinds of optical films. In a preferred embodiment, the first prism film 300 can be an optical film having a microstructure (e.g., a prism), such as a brightness enhancement film. However, in different embodiments, the first prism film 300 can also include optical films including different microstructures, for example, the optical film having the prism microstructure and the diffusion points at the same time. It can be adjusted based on practical needs.

As shown in FIG. 2, the first prism film 300 is disposed in the inner space 130. It is preferred that a flange 111 is formed on the inner surface of the sidewall 110 of the frame 100 for directly or indirectly supporting the edge of the bottom surface of the first prism film 300. In other words, the bottom edge of the first prism film 300 can be directly disposed on the flange 111, or disposed above the flange 111 via the light guide plate or other optical films. As shown in FIG. 2, a plurality of prisms 310 is formed on the first prism film 300. It is preferred that the plurality of prisms 310 is arranged in parallel and extends along the first extending direction 330, that is to say, the plurality of prisms 310 can have the first extending direction 330. The first prism film 300 also has a surrounding edge 350. The surrounding edge 350 can have a first edge 351 and a second edge 352, and the first edge 351 and the second edge 352 are connected and vertical to each other. In this embodiment, the first edge 351 is a short-side edge, and the second edge 352 is a long-side edge.

Figure 3A:
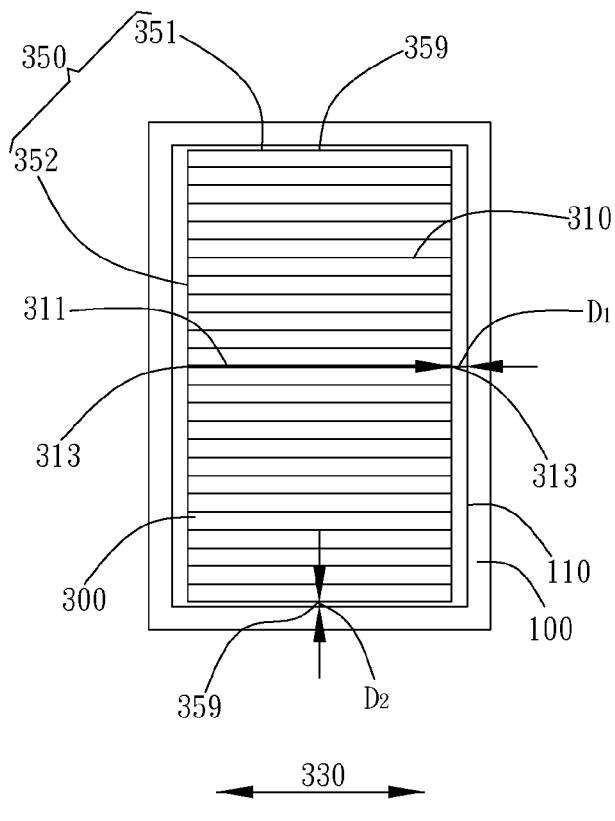
FIG. 3A-3D illustrate schematic diagrams of embodiments with different first prism directions.

FIG. 3A shows a schematic diagram of the first extending direction 330 substantially parallel to the first edge 351. As shown in FIG. 2 and FIG. 3A, a center prism 311 of the plurality of prisms 310 is located at a substantial center position of the plurality of prisms 310. It should be noticed that the substantial center position is not limited to the center position of the prisms 310; it can be also located among the central 50% positions of the prisms 310. The center prism 311 insects with the surrounding edge 350 at two intersection points 313. A first distance $D_1$ is between the intersection points 313 and the sidewall 110 of the frame 100. The surrounding edge 350 further has an end point 359 located farthest from the center prism 311. In a preferred embodiment, the end point 359 is located at a position of the surrounding edge 350 having the same distance to the two intersection points 313. In other words, the end point 359 equally divides the distance between the two intersection points 313 along the surrounding edge 350. However, in different embodiments, the end point 359 can be a point vertically farthest to the center prism 311 on the surrounding edge 350 or generated by other calculation ways. A second distance $D_2$ is between the end point 359 and the sidewall 110 of the frame 100. The first distance $D_1$ is larger than the second distance $D_2$.

In the embodiment shown in FIG. 3A, the first extending direction 330 is substantially parallel to the first edge 351 and substantially vertical to the second edge 352. In this embodiment, after the first prism film 300 is heated or under a temperature-related environmental test, the first prism film 300 will generate larger deformation along the first extending direction 330 due to thermal expansion. In other words, the amount of deformation of the second edge 352 toward the sidewall will be larger than the amount of deformation of the first edge 351 toward the sidewall. In the embodiment shown in FIG. 3A, the angle between the first extending direction 330 and the first edge 351 is substantially 0°. However, it is assumed that the right side of the first edge 351 is the start point and the angle between the first edge 351 and the first extending direction 330 in counterclockwise direction is positive, when the angle between the first extending direction 330 and the first edge 351 ranges from 22.5° to −22.5°, the first edge 351 and the second edge 352 on the first prism film 300 will have the similar deformation behavior and relationship as described above.

In this embodiment, the intersection point 313 of the center prism 311 and the surrounding edge 350 is located on the second edge 352, and the end point 359 is located on the first edge 351. The first distance $D_1$ is the distance between the second edge 352 and the sidewall 110, and the second distance $D_2$ is the distance between the first edge 351 and the sidewall 110. Since the first distance $D_1$ is larger than the second distance $D_2$, the condition that the first prism film 300 is deformed to interfere with the frame 100 to be warped or wavy can be avoided, and the positioning reliability vertical to the first extending direction 330 can be also maintained.

Figure 3B:
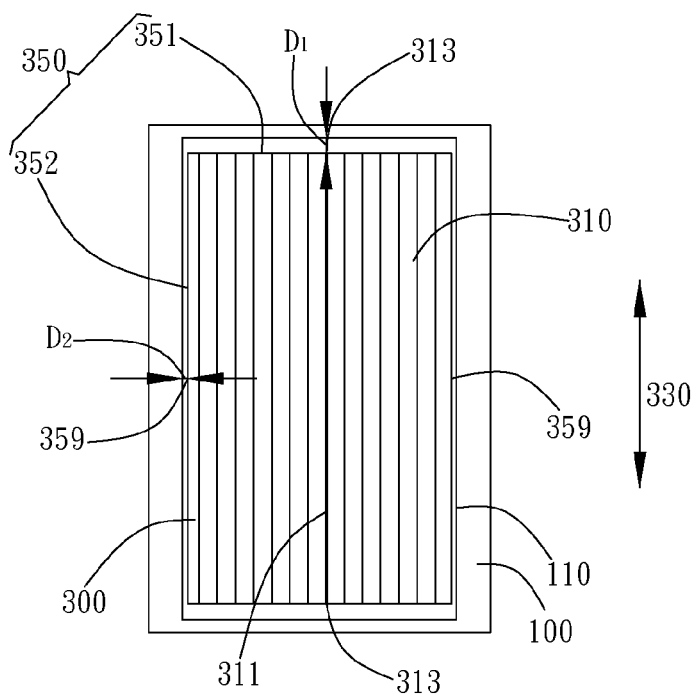

FIG. 3B shows a schematic diagram of the first extending direction 330 substantially vertical to the first edge 351. In the embodiment shown in FIG. 3B, the first extending direction 330 is substantially vertical to the first edge 351 and substantially parallel to the second edge 352. In this embodiment, after the first prism film 300 is heated or under a temperature-related environmental test, the first prism film 300 will generate larger deformation along the first extending direction 330 due to thermal expansion. In other words, the amount of deformation of the second edge 352 toward the sidewall will be smaller than the amount of deformation of the first edge 351 toward the sidewall. In the embodiment shown in FIG. 3B, the angle between the first extending direction 330 and the first edge 351 is substantially 90°. However, it is assumed that the right side of the first edge 351 is the start point and the angle between the first edge 351 and the first extending direction 330 in counterclockwise direction is positive, when the angle between the first extending direction 330 and the first edge 351 ranges from 67.5° to 112.5°, the first edge 351 and the second edge 352 on the first prism film 300 will have the similar deformation behavior and relationship as described above.

In this embodiment, the intersection point 313 of the center prism 311 and the surrounding edge 350 is located on the first edge 351, and the end point 359 is located on the second edge 352. The first distance $D_1$ is the distance between the first edge 351 and the sidewall 110, and the second distance $D_2$ is the distance between the second edge 352 and the sidewall 110. Since the first distance $D_1$ is larger than the second distance $D_2$, the condition that the first prism film 300 is deformed to interfere with the frame 100 to be warped or wavy can be avoided, and the positioning reliability vertical to the first extending direction 330 can be also maintained.

Figure 3C:
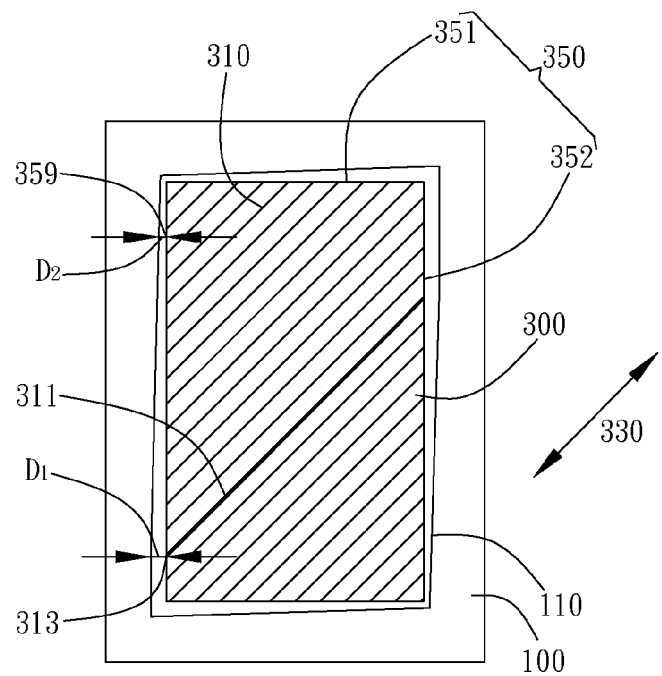

FIG. 3C shows a schematic diagram of another first extending direction 330. In the embodiment shown in FIG. 3C, the angle between the first extending direction 330 and the first edge 351 is substantially 45°. In this embodiment, after the first prism film 300 is heated or under a temperature-related environmental test, the first prism film 300 will generate larger deformation along the first extending direction 330 due to thermal expansion. In other words, the amount of deformation of the surrounding edge 350 at the intersection point 313 will be larger than the amount of deformation at the end point 359. That is to say, the distance between an edge of a diagonal line vertical to the first extending direction 330 on the first prism film 300 and the sidewall 110 is the second distance $D_2$, the distance between an edge of a diagonal line parallel to the first extending direction 330 and the sidewall 110 is the first distance $D_1$. Since the first distance $D_1$ is larger than the second distance $D_2$, the condition that the first prism film 300 is deformed to interfere with the frame 100 to be warped or wavy can be avoided, and the positioning reliability vertical to the first extending direction 330 can be also maintained. It is assumed that the right side of the first edge 351 is the start point and the angle between the first edge 351 and the first extending direction 330 in counterclockwise direction is positive, when the angle between the first extending direction 330 and the first edge 351 ranges from 22.5° to 67.5°, the first edge 351 and the second edge 352 on the first prism film 300 will have the similar deformation behavior and relationship as described above.

In this embodiment, the intersection point 313 of the center prism 311 and the surrounding edge 350 is located at the position of the surrounding edge 350 near a diagonal direction, and this diagonal direction is substantially parallel to the first extending direction 330. That is to say, the difference in angle between the diagonal direction and the first extending direction 330 is relatively small, and the end point 359 is located at the position of the surrounding edge 350 near another diagonal direction which is substantially vertical to the first extending direction 330. As shown in FIG. 3C, the sidewall 110 of the frame 100 is tilted relative to the first edge 351 and the second edge 352. When the sidewall 110 approaches the intersection point 313, the distance between the sidewall 110 and the surrounding edge 350 is larger. When the sidewall 110 approaches the end point 359, the distance between the sidewall 110 and the surrounding edge 350 is smaller. In addition, in different embodiments, the sidewall 110 can be also tilted in a non-linear way, such as tilted in an arc way or a step way. Since the first distance $D_1$ is larger than the second distance $D_2$, the condition that the first prism film 300 is deformed to interfere with the frame 100 to be warped or wavy can be avoided, and the positioning reliability vertical to the first extending direction 330 can be also maintained.

Figure 3D:
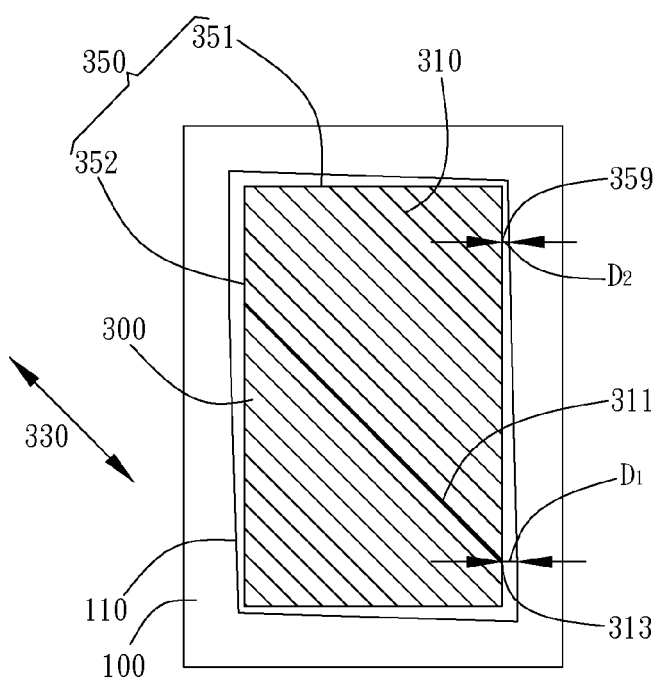

FIG. 3D shows a schematic diagram of another first extending direction 330. In the embodiment shown in FIG. 3D, the angle between the first extending direction 330 and the first edge 351 is substantially 135°. In this embodiment, after the first prism film 300 is heated or under a temperature-related environmental test, the first prism film 300 will generate larger deformation along the first extending direction 330 due to thermal expansion. In other words, the amount of deformation of the surrounding edge 350 at the intersection point 313 will be larger than the amount of deformation at the end point 359. It is assumed that the right side of the first edge 351 is the start point and the angle between the first edge 351 and the first extending direction 330 in counterclockwise direction is positive, when the angle between the first extending direction 330 and the first edge 351 ranges from 112.5° to 157.5°, the first edge 351 and the second edge 352 on the first prism film 300 will have the similar deformation behavior and relationship as described above.

In this embodiment, the intersection point 313 of the center prism 311 and the surrounding edge 350 is located at the position of the surrounding edge 350 near a diagonal direction, and this diagonal direction is substantially parallel to the first extending direction 330, that is to say, the angle between the diagonal direction and the first extending direction 330 is relatively smaller, and the end point 359 is located at the position of the surrounding edge 350 near another diagonal direction, and this diagonal direction is substantially vertical to the first extending direction 330. As shown in FIG. 3D, the sidewall 110 of the frame 100 is tilted relative to the first edge 351 and the second edge 352. When the sidewall 110 approaches the intersection point 313, the distance between the sidewall 110 and the surrounding edge 350 is larger. When the sidewall 110 approaches the end point 359, the distance between the sidewall 110 and the surrounding edge 350 is smaller. That is to say, the distance between an edge of a diagonal line vertical to the first extending direction 330 on the first prism film 300 and the sidewall 110 is the second distance $D_2$. The distance between an edge of a diagonal line parallel to the first extending direction 330 on the first prism film 300 and the sidewall 110 is the first distance $D_1$.

In addition, in different embodiments, the sidewall 110 can be also tilted in a non-linear way, such as tilted in an arc way or a step way. Since the first distance $D_1$ is larger than the second distance $D_2$, the condition that the first prism film 300 is deformed to interfere with the frame 100 to be warped or wavy can be avoided, and the positioning reliability vertical to the first extending direction 330 can be also maintained.

Figure 4A:
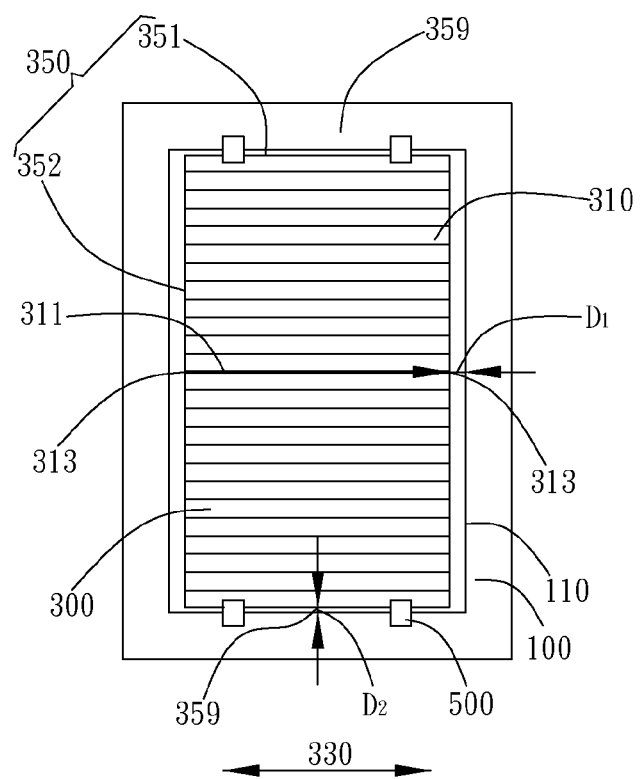
FIG. 4A and FIG. 4B illustrate schematic diagrams of using a positioning tape as the first positioning device.
Figure 4B:
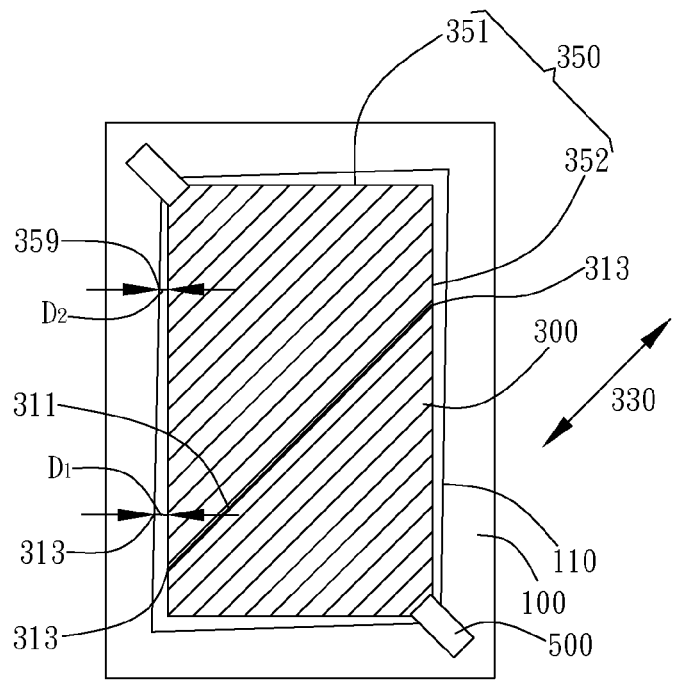

FIG. 4A and FIG. 4B illustrate schematic diagrams of using a positioning tape as the first positioning device. As shown in FIG. 4A, the surrounding edge 350 of the first prism film 300 has a first positioning device 500 to position the first prism film 300 on the frame 100. It is preferred that the first positioning device 500 is disposed near the end point 359. Since the heat deformation generated by the first prism film 300 at the end point 359 is smaller, the end point 359 is suitable to dispose the first positioning device 500. In this embodiment, the first positioning device 500 is a positioning tape. One end of the positioning tape is adhered to the position near the end point 359 on the first prism film 300, and the other end of the positioning tape is adhered to the position corresponding to the end point 359 on the frame 100. In the embodiment shown in FIG. 4A, the end point 359 is located at a center position of the first edge 351, and the first positioning device 500 formed by the positioning tape is adhered at the first edge 351. However, in the embodiment shown in FIG. 4B, the end point 359 is located near the diagonal direction on the surrounding edge 350, and the first positioning device 500 formed by the positioning tape is adhered to the diagonal corner.

Figure 5A:
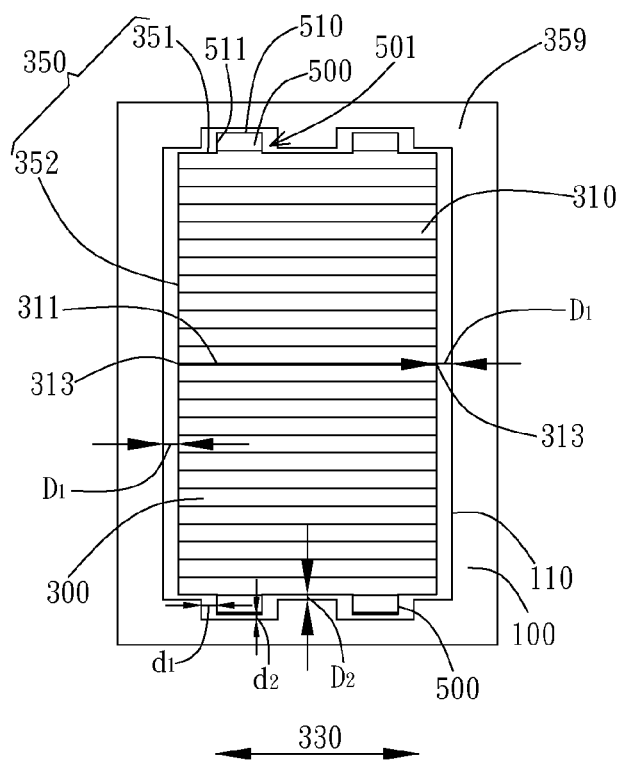
FIG. 5A and FIG. 5B illustrate schematic diagrams of using a latch as the first positioning device.
Figure 5B:
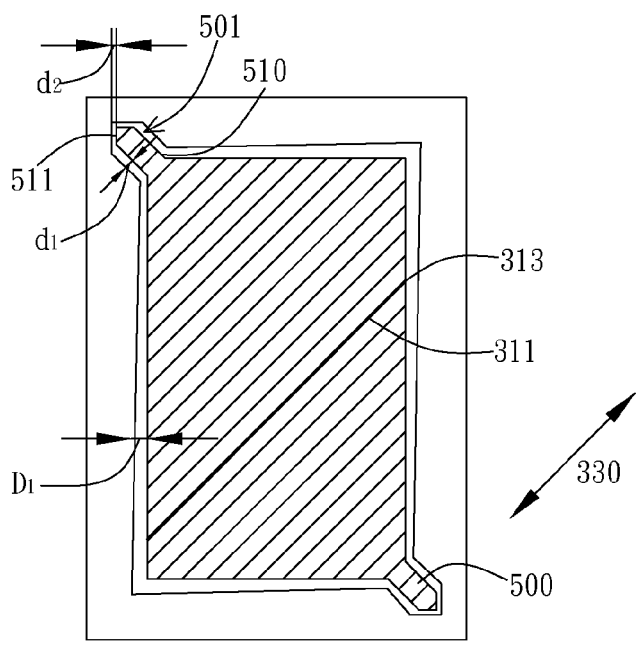

FIG. 5A and FIG. 5B illustrate schematic diagrams of using a latch as the first positioning device. In the embodiment shown in FIG. 5A, the first positioning device 500 is formed by the latch on the surrounding edge 350. At this time, a corresponding positioning groove 501 is formed on the frame 100 to contain the latch which is used as the first positioning device 500 to position the entire first prism film 300. In a preferred embodiment, as shown in FIG. 5A, the latch has a plurality of sides 510 and 511, wherein the distance $d_1$ between the side 511 closest to the normal direction of the first extending direction 330 and a side of the positioning groove 501 is larger than the distance $d_2$ between the other sides 510 and the side of the positioning groove 501. In other words, the distance between the side 511 approximately vertical to the first extending direction 330 and the side of the positioning groove 501 will be larger than the distance between the side 510 and the side of the positioning groove 501.

As shown in FIG. 5A, when the first positioning device 500 is formed at the first edge 351, the first positioning device 500 can be a rectangle. Except the side connecting to the first prism film 300, the first positioning device 500 still has other three sides 510 and 511. The sides 511 are vertical to the first extending direction 330. The distance $d_1$ between the sides 511 and the side of the positioning groove 501 is larger. Since the first positioning device 500 will generate expanding deformation when the first prism film 300 is heated, it is preferred to reserve a larger distance accordingly.

In the embodiment shown in FIG. 5B, when the first positioning device 500 is disposed at the corner of the first prism film 300 to match different first extending direction 330, it is preferred that the first positioning device 500 is a prominent, and except a side connecting to the first prism film 300, the first positioning device 500 still has four sides 510 and 511. Two vertical sides 511 will extend to form the prominent. The side 511 forming the prominent will be approximately parallel to the first extending direction 330 than the sides 510. At this time, the distance $d_2$ between the side 511 forming the prominent and the side of the positioning groove 501 will be smaller than the distance $d_1$ between the sides 510 and the side of the positioning groove 501.

Figure 6:
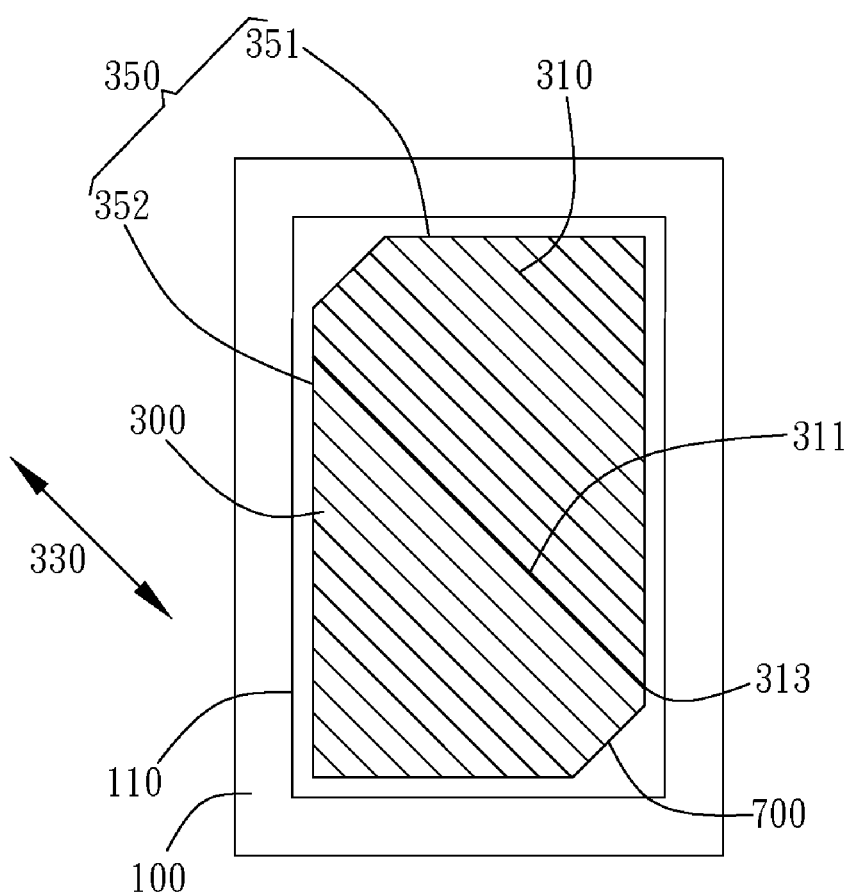
FIG. 6 illustrates a schematic diagram of the first prism film having a truncated angle.

FIG. 6 illustrates a schematic diagram of the first prism film having a truncated angle. In the embodiment shown in FIG. 6, the first prism film 300 is a rectangle and has four corners. However, in different embodiments, the first prism film 300 can also have different forms; different amount of corners will be formed. As shown in FIG. 6, the corner near the intersection point 313 can be a truncated angle 700 to increase the distance between the frame 100 and the surrounding edge 350 of the first prism film 300 in the corner part. After the truncated angle 700 is formed, the distance between the edge of the surrounding edge 350 at the truncated angle 700 and the sidewall 110 of the frame 100 will be larger than the second distance $D_2$. With this design, the condition that the corner of the first prism film 300 interferes with the frame 100 will be avoided.

Figure 7A:
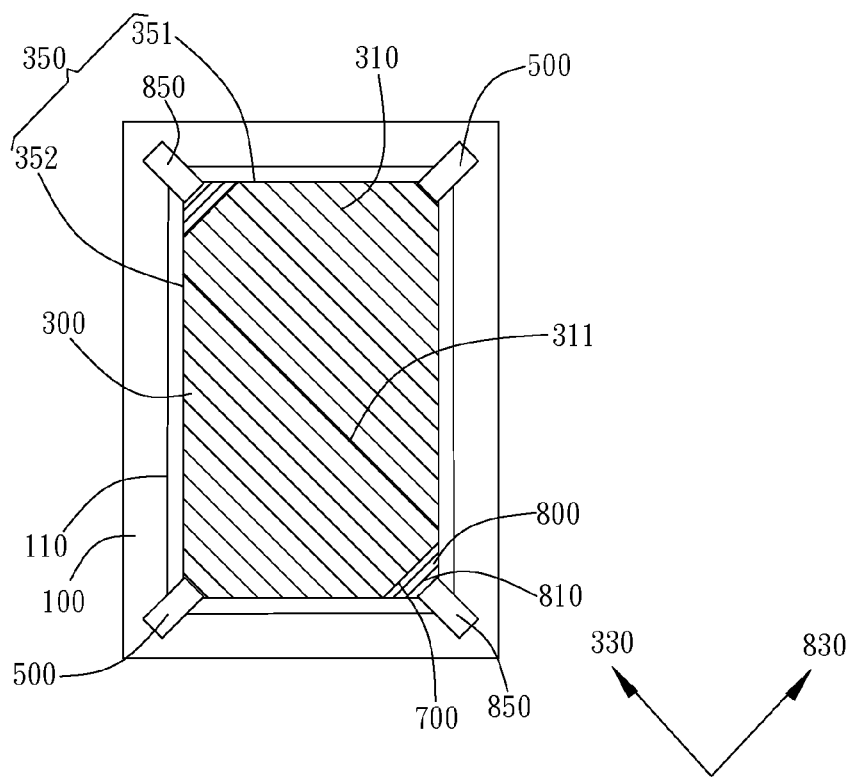
FIG. 7A and FIG. 7B illustrate schematic diagrams of adding a second prism film.
Figure 7B:
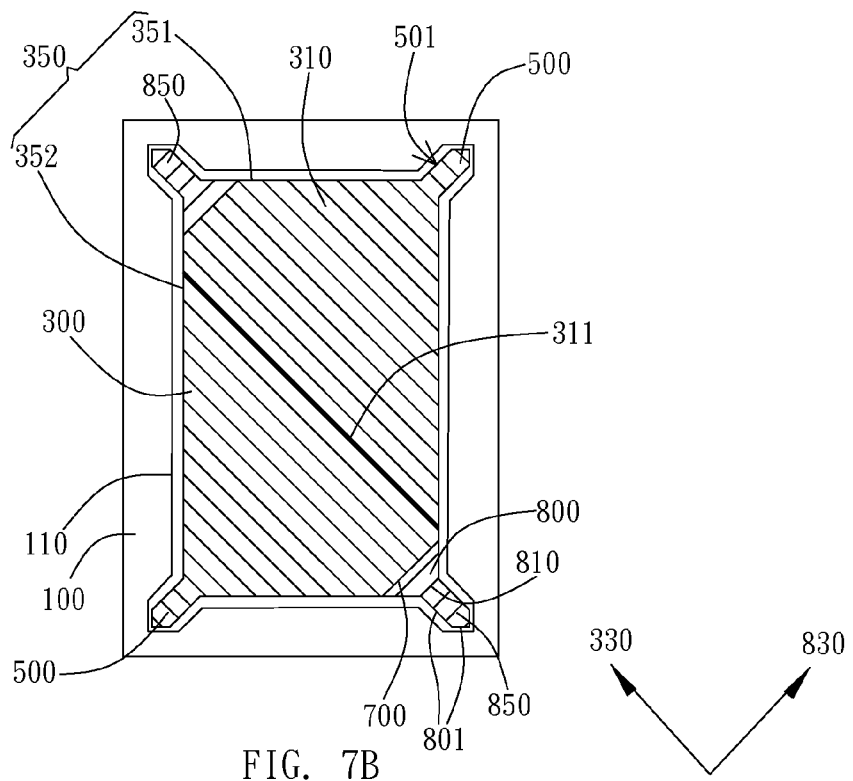

FIG. 7A and FIG. 7B illustrate schematic diagrams of adding a second prism film. As shown in FIG. 7A, the backlight module can further include a second prism film 800 superimposed under the first prism film 300. In a preferred embodiment, the second prism film 800 has a plurality of prisms 810 extending along the second extending direction 830; it is preferred that the second extending direction 830 is substantially vertical to the first extending direction 330. Since it is preferred that the first extending direction 330 is substantially vertical to the second extending direction 830, the corner near the intersection point of the center prism and the surrounding edge of the second prism film 800 can be a truncated angle to increase the distance between the frame 100 and the surrounding edge of the second prism film 800 in the corner part. The second prism film 800 can directly extend to be exposed between the truncated angle 700 and sidewall 110 instead of forming a truncated angle at the corner of the truncated angle 700 on the first prism film 300.

As mentioned above, the first positioning device 500 can be disposed on the first prism film 300, and the second positioning device 850 can be also disposed on the second prism film 800. In the embodiment shown in FIG. 7A, the second positioning device 850 is disposed on the part of the second prism film 800 exposed out of the truncated angle 700. As shown in FIG. 7A, the second positioning device 850 is formed by a positioning tape and adhered to the frame 100 and the part of the second prism film 800 exposed out of the truncated angle 700. However, in the embodiment shown in FIG. 7B, the second positioning device 850 can be also formed by a latch, and the latch is contained in the positioning groove 501 formed on the frame 100. In this embodiment, the distance relationship between the side of the second positioning device 850 (the latch) and the side of the positioning groove 501 is similar to the distance relationship between the side of the first positioning device 500 (the latch) and the side of the positioning groove 501. The second positioning device 850 (the latch) has a plurality of sides 801. The distance between the side 801 closest to a normal direction of the second extending direction 830 among the plurality of sides 801 and a side of the positioning groove 501 is larger than the distance between the other sides 801 and the side of the positioning groove 501. As shown in the embodiment shown in FIG. 7B, it is preferred that the second positioning device 850 (the latch) is a prominent. Except a side connecting to the second prism film 800, the second positioning device 850 still has four sides 801; two vertical sides 801 will extend to form the prominent. The sides 801 forming the prominent will be approximately parallel to the second extending direction 830 than the other sides 801. At this time, the distance $d_2$ between the sides 801 forming the prominent and the side of the positioning groove 501 will be smaller than the distance $d_1$ between the other sides 801 and the side of the positioning groove 501.

Figure 8:
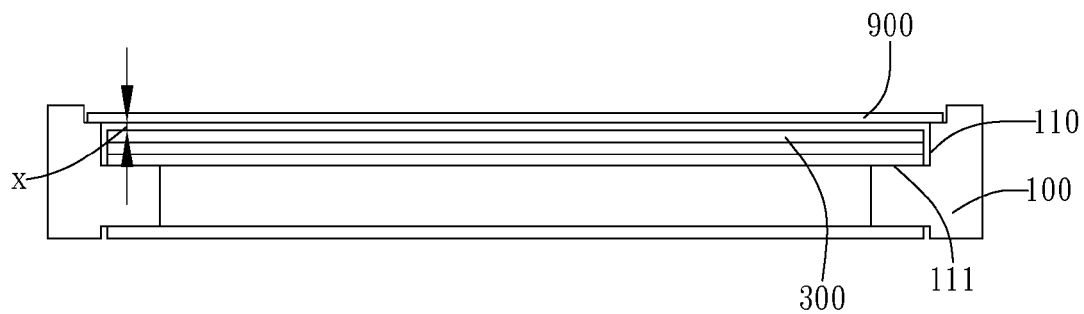
FIG. 8 illustrates a cross-sectional diagram of adding a polarizing film.
Figure 9:
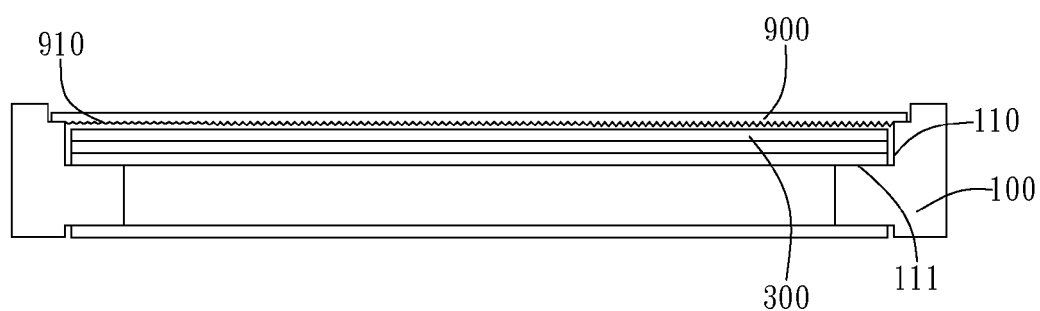
FIG. 9 illustrates a cross-sectional diagram of the polarizing film having a rough surface.

FIG. 8 illustrates a cross-sectional diagram of adding a polarizing film. In the embodiment shown in FIG. 8, the backlight module further includes a polarizing film 900 above the first prism film 300, namely above the light emitting surface of the first prism film 300. As shown in FIG. 8, there is a distance X between the polarizing film 900 and the first prism film 300, and it is preferred that the distance X is smaller than 0.05 mm. With this design, the condition that the first prism film 300 is heated and expanded to be warped or wavy can be avoided. FIG. 9 illustrates a cross-sectional diagram of the polarizing film having a rough surface. In the embodiment shown in FIG. 9, a surface of the polarizing film 900 facing toward the first prism film 300 is a rough surface 910. With this design, the condition that the polarizing film 900 and the first prism film 300 are adhered to each other can be avoided, so that the condition that the first prism film 300 is warped because the polarizing film 900 and the first prism film 300 are adhered to each other can be avoided. In addition, it should be noticed that the polarizing film 900 can be adhered to the bottom surface of the display panel.

Although the present invention has been illustrated and described with reference to the preferred embodiment thereof, it should be understood that it is in no way limited to the details of such embodiment but is capable of numerous modifications within the scope of the appended claims.

What is claimed is:
1. A backlight module, comprising:
a frame having a sidewall to enclose an inner space; and
a first prism film disposed within the inner space, a plurality of prisms formed on the first prism film, the plurality of prisms extending along a first extending direction, and the first prism film having a surrounding edge;
wherein a center prism of the plurality of prisms is substantially located at a center position of the plurality of prisms, a first distance is between the sidewall and an intersection point that the center prism intersects the surrounding edge; a second distance is between the sidewall and an end point located on the surrounding edge and farthest from the center prism; the first distance is larger than the second distance.
2. The backlight module of claim 1, wherein the surrounding edge has a first positioning device near the end point, the first positioning device positions the first prism film on the frame.
3. The backlight module of claim 2, wherein the first positioning device comprises a positioning tap adhered on an area of the frame and the first prism film near the end point.
4. The backlight module of claim 2, wherein the first positioning device comprises a latch, the latch is contained in a positioning groove formed on the frame.
5. The backlight module of claim 4, wherein the latch has a plurality of sides, the distance between a side closest to a normal direction of the first extending direction among the plurality of sides and a side of the positioning groove is larger than the distance between the other sides among the plurality of sides and the side of the positioning groove.

6. The backlight module of claim 1, wherein a plurality of corners are formed on the first prism film, one of the plurality of corners near the intersection point is a truncated angle, the distance between an edge of the truncated angle and the sidewall of the frame is larger than the second distance.

7. The backlight module of claim 6, further comprising a second prism film superimposed under the first prism film, wherein a corner of the second prism film and exposed between the truncated angle and the sidewall.

8. The backlight module of claim 7, wherein the corner of the second prism film comprises a second positioning device to position the second prism film on the frame.

9. The backlight module of claim 8, wherein the second positioning device comprises a positioning tape adhered on the frame and a part of the second prism film exposed out of the truncated angle.

10. The backlight module of claim 8, wherein the second positioning device comprises a latch, the latch is contained in a positioning groove formed on the frame.

11. The backlight module of claim 7, wherein the second prism film extends along a second extending direction substantially vertical to the first extending direction.

12. The backlight module of claim 10, wherein the latch has a plurality of sides, the second prism film has a second extending direction, the distance between a side closest to a normal direction of the second extending direction among the plurality of sides and a side of the positioning groove is larger than the distance between the other sides among the plurality of sides and the side of the positioning groove.

13. The backlight module of claim 1, wherein the surrounding edge comprises a first edge and a second edge, the first edge and the second edge are connected and vertical to each other, when an angle between the first extending direction and the first edge ranges from 22.5° to −22.5°, the distance between the first edge and the sidewall is the second distance, and the distance between the second edge and the sidewall is the first distance.

14. The backlight module of claim 1, wherein the surrounding edge comprises a first edge and a second edge, the first edge and the second edge are connected and vertical to each other, when an angle between the first extending direction and the first edge ranges from 67.5° to 112.5°, the distance between the first edge and the sidewall is the first distance, and the distance between the second edge and the sidewall is the second distance.

15. The backlight module of claim 1, wherein the surrounding edge comprises a first edge and a second edge, the first edge and the second edge are connected and vertical to each other, when an angle between the first extending direction and the first edge ranges from 22.5° to 67.5°, the distance between an edge of a diagonal line vertical to the first extending direction on the first prism film and the sidewall is the second distance, and the distance between an edge of a diagonal line parallel to the first extending direction on the first prism film and the sidewall is the first distance.

16. The backlight module of claim 1, wherein the surrounding edge comprises a first edge and a second edge, the first edge and the second edge are connected and vertical to each other, when an angle between the first extending direction and the first edge ranges from 112.5° to 157.5°, the distance between an edge of a diagonal line vertical to the first extending direction on the first prism film and the sidewall is the first distance, and the distance between an edge of a diagonal line parallel to the first extending direction on the first prism film and the sidewall is the second distance.

17. The backlight module of claim 1, further comprising a polarizing film disposed above the first prism film; wherein the distance between the polarizing film and the first prism film is smaller than or equal to 0.05 mm.

18. The backlight module of claim 1, further comprising a polarizing film disposed above the first prism film; wherein a surface of the polarizing film facing toward the first prism film is a rough surface.

* * * * *